J. E. THEBAUD.
VARIABLE SPEED TRANSMISSION DEVICE.
APPLICATION FILED AUG. 25, 1910.
1,041,373.
Patented Oct. 15, 1912.
2 SHEETS—SHEET 1.
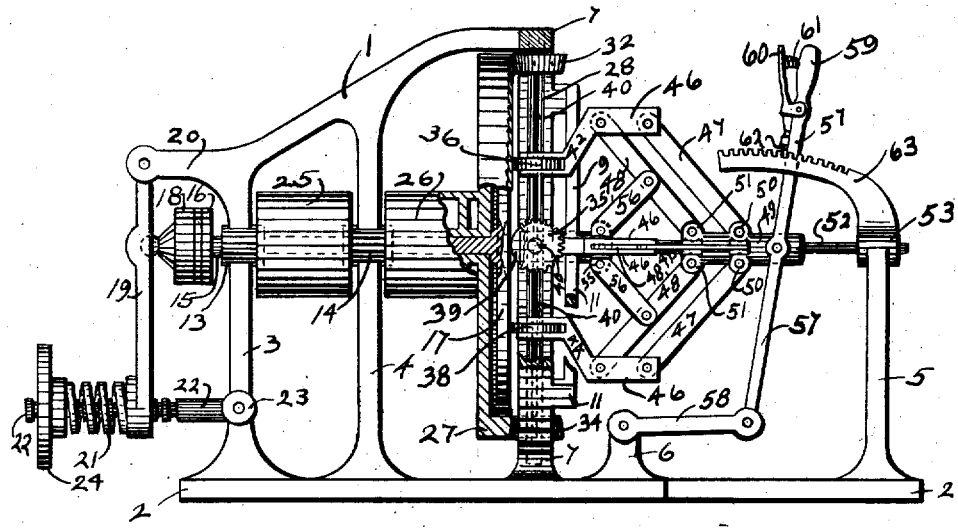
Fig. 1.
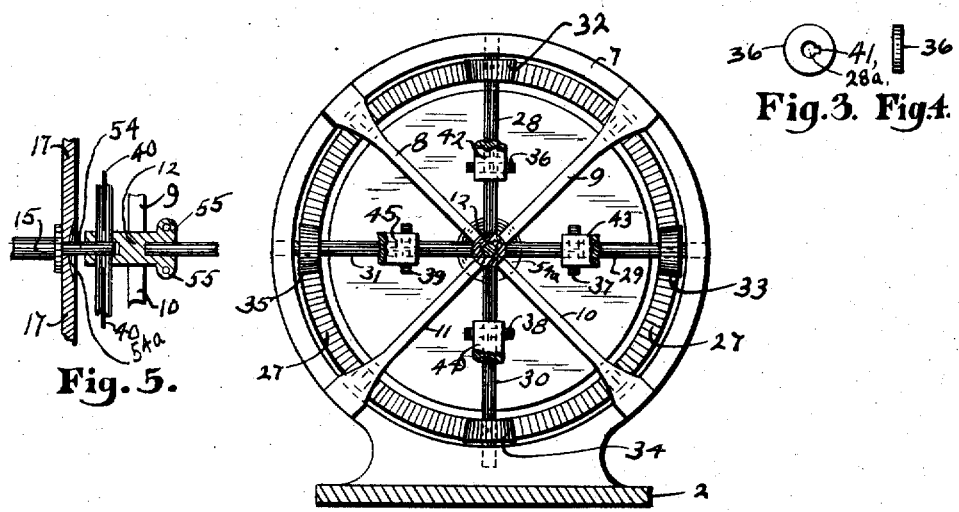
Fig. 5.   Fig. 3.   Fig. 4.
Fig. 2.
WITNESSES:
Millard Fillmore Bowen
J. Elmer Mighton
INVENTOR
John Edward Thebaud J. E. THEBAUD.
VARIABLE SPEED TRANSMISSION DEVICE.
APPLICATION FILED AUG. 25, 1910.

1,041,373.

Patented Oct. 15, 1912.

2 SHEETS—SHEET 2.

WITNESSES:

INVENTOR
John Edward Thebaud.

UNITED STATES PATENT OFFICE.

JOHN EDWARD THEBAUD, OF BUFFALO, NEW YORK, ASSIGNOR OF ONE-THIRD TO JOHN FRANEY AND ONE-THIRD TO I. ELMER MIGHTON, BOTH OF BUFFALO, NEW YORK.

VARIABLE-SPEED TRANSMISSION DEVICE.

1,041,373.   Specification of Letters Patent.   Patented Oct. 15, 1912.

Application filed August 25, 1910. Serial No. 578,909.

*To all whom it may concern:*

Be it known that I, JOHN EDWARD THEBAUD, a citizen of the United States, residing at Buffalo, in the county of Erie and State of New York, have invented certain new and useful Improvements in Variable-Speed Transmission Devices; and I do hereby declare the following to be a full, clear, and exact description of my invention, such as will enable others skilled in the art to which it appertains to make and use the same, reference being had to the accompanying drawings, and to figures of reference marked thereon, which form a part of this specification.

Like figures of reference refer to like parts.

My invention relates to improvements in variable speed transmission devices.

The objects of my invention are—Firstly; to provide means for changing the speed of a driven mechanism at will, or automatically, between limits, while the speed of a driving mechanism may continue practically uniform or be itself changed. (Said means for changing the speed, connects the driving with the driven mechanism.) Secondly; to make possible a gradual change of speed during the running of the machanism, and thus avoid the extraordinary strains, so common to devices using different sets of gears intermittently to vary the speed of the driven mechanism. Thirdly; to provide a device which will permit of transmitting power at a high efficiency.

To these ends, my invention consists of certain details of construction, all of which will be fully hereinafter described and claimed.

Figure 6:
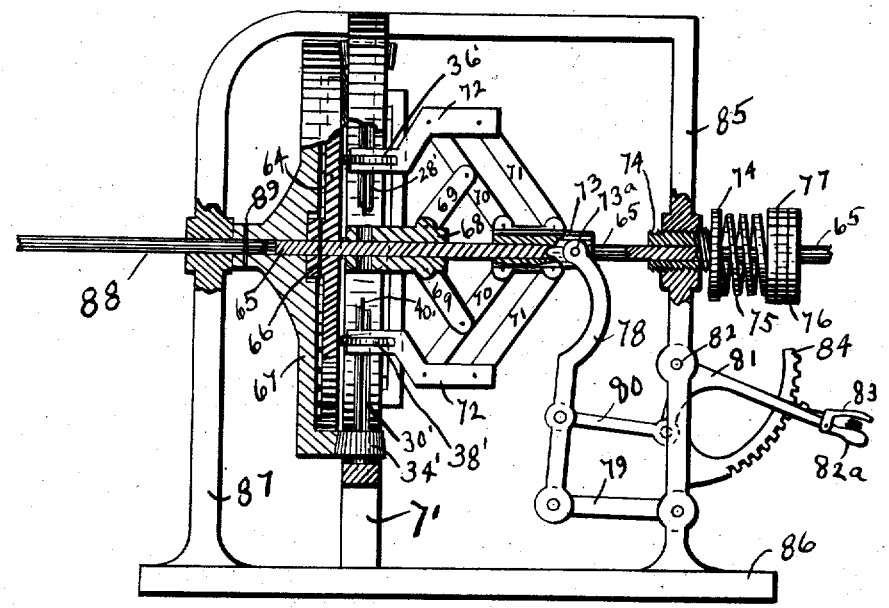
Figure 7:
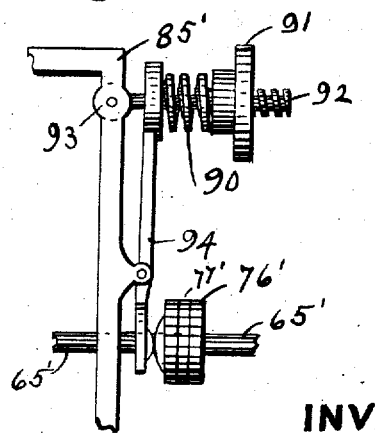

In the drawings, Figure 1 is a side elevation of my invention with parts broken away in order to show the internal construction of the same. Fig. 2 is a transverse vertical sectional view of my invention showing a disk, the disposition of rollers thereon, the bevel gearing and part of the frame. Fig. 3 is a side elevation of a roller. Fig. 4 is an end elevation of a roller. Fig. 5 is a sectional view of part of the disk, the center support and connections. Fig. 6 is a side elevation, partly in section of another form of my invention, different than is shown in Fig. 1. Fig. 7 is a pressure device shown in elevation and has a special adaptation to the form of my invention shown in Fig. 6.

Referring to the drawings, in Fig. 1, 1 is the supporting frame with a base, 2, from which rise the posts, 3, 4, 5 and 6. Ring 7, integral with the base, 2, has four brackets, numbered 8, 9, 10 and 11, which terminate centrally in a bearing box, 12. (See Fig. 2.)

Journaled in the bearings, 13 and 14, respectively, on the posts 3 and 4, is the shaft, 15, which terminates at one end in the plate, 16, integral therewith, and in a disk, 17, at the other end of the said shaft, with which it is made fast. The plate, 16, coöperates with the ball bearing thrust block, 18, which engages a lever, 19, fulcrumed on a horizontal post, 20. The lower end of the lever 19, engages a spring 21, through which passes the threaded rod, 22, pivoted to the post 3, at 23. The nut 24, on the rod 22, is adapted to compress the spring 21 against the lower end of the lever 19.

Mounted on the shaft 15, and secured thereto is the pulley, 25. Journaled on the said shaft is the pulley 26, integral with which is the large bevel gear wheel, 27, which surrounds the disk 17. Meshing with the gear wheel 27, and secured on the ends of splined shafts 28, 29, 30 and 31 (see Figs. 1 and 2) are respectively the small bevel gear wheels, 32, 33, 34 and 35. The splined shafts, 28, 29, 30 and 31 are journaled in the central bearing box 12 and the ring 7. Contacting the disk 17 and slidable on the splined shafts 28, 29, 30 and 31, are the respective rollers, 36, 37, 38 and 39. Splines 40, 40, 40, 40, engage the rollers in the keyways 41, 41 (see Fig. 3) and form a working fit therewith, permitting the said rollers to be slid along their respective shafts, but causing the said shafts to partake of the rotary motion of the said rollers irrespective of the position of the said rollers on said shafts.

Guides 42, 43, 44 and 45, have forked ends within which the respective rollers 36, 37, 38 and 39, are loosely held. These guides have outward extensions 46, 46, 46, 46, positioned parallel to the shaft 15, and have pivoted thereto links 47 and 48, of equal length with respect to the distance between the end pivot points of said links. The said links are also pivoted or journaled to a sleeve 49, at the ears 50 and 51, thereon. The sleeve 49 is adapted to slide on a rod 52. This rod 52 is supported at 53 on the post 5 and extends to within the box 12, diametrically opposite a shaft end 54 (see Fig. 5), concentric with the disk 17 and the shaft 15. Lugs 55, 55, 55, 55, integral with the box 12, have pivoted thereto, respectively, the links 56, 56, 56, 56, which are one-half the length, with respect to the distance between the end pivot points of the same, of either of the said links 47 or 48. The pivot points on 50 and 51, and that in the lug 55, in each set of links connected with the said guides, are all in a straight line, parallel to the shaft 15 and perpendicular to the face of the disk 17. The short links 56 are also pivoted to the center of the links 48, in a straight line with the end pivot points of said links 48. The ends of the long links 47 and 48, are pivoted at the same distance apart in the said extensions 46, as are the ends of the said links pivoted in the ears 50 and 51 on the sleeve 49. Journaled on the sleeve 49 is the lever 57, the lower end of which is hinged to a link 58, journaled on the post 6. The upper end of the lever 57 has a handle 59 to which is pivoted the latch lever 60, held open from the said handle by the spring 61. A bolt 62, connected with the latch lever 60, serves to lock the lever 57 in position on the rack 63, by engaging one of the notches thereon.

In Fig. 6, I have shown a disk 64, fixed on a shaft 65, by the pin 66. The said shaft 65, is journaled in a large bevel gear wheel 67, similar in form and purpose to the gear wheel 27 of Fig. 1. The bearing box 68, has journaled thereon the said shaft 65, also the four roller shafts, similar to 28, 29, 30 and 31, of Fig. 1. Also journaled on the said box 68, are the short links 69, 69, 69, 69, pivoted to links 70, 70, 70, 70, which are pivoted at their inner ends to ears (similar to 51 of Fig. 1), on a sleeve 73. The outer ends of the said links 70, 70, 70, 70, and of the links 71, 71, 71, 71, are pivoted to the extensions of the guides 72, 72, 72, 72. The inner ends of the links 71, 71, 71, 71, are pivoted to ears (similar to 50 of Fig. 1) on the sleeve 73. The guides 72, have forked ends containing rollers 36', 37', 38', 39', respectively (similar to those shown in Figs. 1 and 2). The sleeve 73, fits loosely on the shaft 65 (and corresponds in function to 49 of Fig. 1.) The shaft 65 is journaled in a flanged nut, 74, which is adapted to cause the spring 75 to compress the ball-bearing thrust block 77 against the plate 76, which plate is secured to the shaft 65. A lever, 78, similar in purpose to 57 of Fig. 1, is pivoted on the sleeve 73 at 73ª, and is hinged to a link, 79. A link, 80, connects the lever 78 with the bell crank lever 81, which is pivoted on the frame at the point 82. The handle 82ª, of the lever 81, has pivoted to it the latch lever 83, which operates a lock in conjunction with the rack 84. A post 85, supports one end of the mechanism above the base 86, while the other end of the said mechanism is supported by a post 87. A shaft 88, journaled on the post 87, is secured to the bevel gear wheel 67 by the pin 89.

When it is desirable to increase the thrust effect of the spring used to produce the thrust, I dispense with the nut 74, and have the shaft journaled in a bearing instead of in the nut in the post, and use the lever arrangement shown in Fig. 7. In this figure, 85' is a modified form of the upper end of the post 85 of Fig. 6. 90 is a spring adapted to be compressed by a nut 91, on a threaded rod, 92, which is pivoted at the point 93 on the post 85'. The spring 90, engages the upper end of the lever 94, which is fulcrumed on an extension of the post 85'. The lower end of the lever 94 is forked and straddles the shaft 65', where it engages the ball-bearing thrust block 77' to force it against the plate 76', which is secured to the shaft 65'.

It is evident that if the springs 21, 75 and 90 are respectively omitted in the forms of my device shown in the figures, that the nuts 24, 74 and 91 would still be respectively operative after being screwed into place to make the direct pressure contact that was made by the said springs. Pressure produced in this way between the disk and the rollers would be more rigid and the elasticity of the parts concerned with the pressure would alone act in this capacity.

In operation, considering the form of my invention as shown in Fig. 1, the shaft 15 is revolved by the pulley 25, to which is belted a driving mechanism, not shown in the figures. Pressure, by means of the lever 19 and its attachments, is brought to bear upon the ball-bearing thrust block 18 and the plate 16. The nut 24, compresses the spring 21 against the lower end of the lever 19. The pressure thus exerted is multiplied by the lever 19, by having the short arm (that next the fulcrum on the post 20) above the point of contact of the lever 19 with the block 18. Pressure is transferred through the ball-bearing block 18 to the plate 16 on the end of the shaft 15, forcing the disk 17 against the rollers 36, 37, 38 and 39. As the disk revolves, the tractive effect of the disk on the rollers in contact therewith, caused by the pressure therebetween, revolves their respective splined shafts with the small bevel gear wheels thereon, which, meshing with the large gear wheel 27, causes it to rotate and revolve the pulley 26 connected therewith. To the pulley 26 is belted the driven mechanism, not shown in the figures,—a machine whose speed it is desired to change at times and to control. The speed of the pulley 26, relative to the pulley 25, is a function of the radial position of the said rollers on said disk. When the rollers are caused to close together on the disk, they enter a depression, such as 54ª on Fig. 5, and the disk revolves free from the said rollers. The pressure which would tend to cause the disk to follow and continue to contact the rollers in this closed position, is offset by the limited depth of the hole in the box 12, in which is journaled the shaft end 54, when said shaft end bears against the said box 12. Contact, under these conditions, between the rollers and the disk being broken, the pulley 25 will continue to revolve while the pulley 26 will be at rest. Upon moving the lever 57 toward the disk, the driven mechanism may again be brought into action, and in so doing the increase of speed will be gradual and positive.

Referring to the action of the parts which determine the position of the rollers radially on the disk, attention is called to the relative lengths of links 56 and 48. Link 56 being pivoted to the center of link 48, in a straight line with the end pivot points of said link 48, a circle may be drawn through the end pivot points of both links, if the center pivot point of link 48 be the center of said circle. A line drawn between the end pivot points of link 48 will be a diameter and may be considered the longest side of a triangle having for its other two sides the two lines which may be drawn from the pivot point of the short link 56, which lies in the said circle, to the pivot points of the ends of links 48, 56. Such a triangle, according to geometrical proof, is a right triangle having its right angle in the circumference of the said circle, which in this case is at the fixed pivot point in the ear 55 of the box 12. Since the pivot point at 51 is adapted to be moved in a straight line parallel with the shaft 15, and since the angle at 55 of the triangle above referred to, is a right angle for any position of the links 48 and 56, possible in the construction shown, it follows that the outer pivot point of link 48 is adapted to move in a straight line perpendicular to the shaft 15, and parallel to the operative face of the disk 17. Considering the construction, above described, of the parallel bars or links 47 and 48, and connections, the guides 42, 43, 44, 45, will always be adapted to be moved parallel to any position of rest and at a fixed distance from the operative face of the disk, thus positioning properly the rollers contained thereon without binding, along their respective splined shafts. As the sleeve 49 is caused to move toward the disk 17, by the lever 57, the rollers are caused to be moved outward from the center of the disk and to contact parts of the same having greater periphery speed resulting in increasing the speed of pulley 26, assuming that the speed of pulley 25 continues constant. A reverse movement of the lever 57 will cause the pulley 26 to move slower.

If the tractive effect of the disk upon the rollers, in the running of the device, is not sufficient to prevent slipping, then the said tractive effect may be increased by tightening the nut 24 against the spring 21. The increase in pressure thus formed will increase the friction between the disk and the rollers. By unscrewing the nut 24, the friction may be decreased between the disk and the rollers as well as in the bearings of the splined shafts. It is therefore desirable to so adjust the nut 24 as to produce only so much friction between the disk and the rollers as will insure proper contact there-between without slipping.

I have above described a condition of running the device, considering the speed of the disk as constant, and that of the rollers, variable. Now, consider a running condition where the pulley 26 is belted to a motor, turning at a constant speed. The rollers in this latter case will then revolve at a constant speed irrespective of their position on the disk, and the disk will have a speed which will be a function of the position of the rollers thereon. As the rollers approach the center of the disk, the speed of the disk will increase, and will decrease when the rollers approach the periphery of the disk, where the disk may be set at rest, during the running of the rollers by providing an annular recess near the periphery of the disk into which the rollers may enter and disengage the operative face of the disk. The pulley 25, will, in the conditions of speed last described, become the variable speed pulley, and may be belted to a driven mechanism.

When it is desirable to introduce a variable speed device in a line of shafting, I provide a form of my invention as is shown in Fig. 6. Here the two shafts 65 and 88 are in the same straight line, and are so journaled. Considering the shaft 65 as the driving shaft and the shaft 88 as the driven shaft, the disk 64, when revolved by the shaft 65, will, by the tractive effect between the disk 64 and the rollers 36′, 38′, etc., produced by the outward thrust of the spring 75 against the ball-bearing block and the plate 76, cause the large gear wheel 67, in mesh with the small gear wheels on the splined shafts, to revolve the shaft 88 at a speed depending on the radial position of the said last named rollers, which position is fixed by the position of the lever 78; assuming that the speed of the shaft 65 remains constant. If the shaft 88 is made the constant running driving shaft, then will the shaft 65 become the driven shaft, whose speed will be a function of the position of the rollers on the disk shown in Fig. 6, and can be fixed to run at a certain speed by locking the lever 81 on the rack 84 at such a point thereon which will produce the desired speed in the running of the device. If either of the sleeves 49 or 73 be connected by intervening mechanism with some moving part of the driven mechanism, which is adapted to govern the speed of the variable speed device, then will automatic control of the speed of the driven mechanism be attained.

Many modifications of my invention, other than those shown in the drawings and described in this specification, may be made in order to adapt the said invention to conditions required by the various applications thereof, and yet not vary from the spirit of the said invention; I therefore do not wish to be confined to the forms of same as here shown and described.

I claim—

1. In a variable speed transmission device, a disk, a plurality of rollers in tractive contact upon said disk, adapted to rotate respectively, about axes which are radial to the axis of rotation of the said disk, means adapted to simultaneously position said rollers in the same path upon the said disk, concentric with the axis of rotation of the said disk, a rotative element, concentric with the said disk, means operative about the periphery of said disk, connecting the said rotative element with said roller or rollers, adapted to rotate with the same, a compression member adapted to adjustably produce pressure between the said disk and the said roller or rollers.

2. In a variable speed transmission device, a disk, a plurality of rollers adapted to be positioned radially and to roll on said disk, a shaft adapted to pass loosely through each of said rollers and to rotate therewith, means adapted to simultaneously position said rollers in the same path upon the said disk, concentric with the axis of rotation of the said disk, a rotative element, concentric with the said disk, means operative about the periphery of said disk, connecting the said rotative element with said roller or rollers, adapted to rotate with the same, a compression member adapted to adjustably produce pressure between the said disk and the said roller or rollers, means within said device coöperating with the said rollers and said disk, adapted to connect the same with a driving mechanism, means within said device for coöperating with said rollers and said disk and adapted to connect the same with a driven mechanism.

3. In a variable speed transmission device, a disk, one or more rollers adapted to be positioned radially and to roll on said disk, and a shaft adapted to pass loosely through each of said rollers and to be locked thereto with respect to rotation, a guiding element connected with each of said rollers, two links of equal length journaled on said guiding element, one link of one-half the length of either of the two said equal links journaled on one of the two said equal links at the center of the same, and journaled at its other end at a fixed point within said device, a sleeve adapted to be slid in a line perpendicular to the face of said disk and having journaled thereto each of the said links of equal length, means adapted to position the said sleeve with respect to said disk, a compression member adapted to adjustably produce pressure between the said disk and said roller or rollers, means within said device coöperating with the said rollers and said disk, adapted to connect the same with a driving mechanism, means within the said device for coöperating with said rollers and said disk and adapted to connect the same with a driven mechanism.

4. In a variable speed transmission device, a disk, one or more rollers in tractive contact with said disk, and adapted to be positioned radially thereon, a shaft adapted to pass through each of said rollers, and to be locked thereon, with respect to motion of rotation, a guiding element connected with each of said rollers, two links of equal length journaled on said guiding element, one link of one-half the length of either of the two said equal links journaled on one of the two said equal links at the center of the same, and journaled at its other end at a fixed point within said device, a sleeve adapted to be slid in a line perpendicular to the face of said disk and having journaled thereto each of the said links of equal length, means adapted to position the said sleeve with respect to said disk, a compression member adapted to adjustably produce pressure between the said disk and said roller or rollers, a bevel gear wheel upon the outer end of each of said shafts, a large bevel gear wheel adapted to mesh with each of said gear wheels, and to rotate about the same axis of rotation as that of the said disk, means within the said device coöperating with the said rollers and the said disk, adapted to connect the same with a driving mechanism, means within the said device for coöperating with said rollers and said disk, adapted to connect the same with the driven mechanism.

5. In a variable speed transmission device, a rotative element, a disk adapted to rotate concentrically to said rotative element, a plurality of rollers adapted to be positioned radially and to roll on said disk, a shaft loosely keyed within each of said rollers, adapted to rotate with the same for any radial position of the roller with respect to said disk within operative limits, said shaft being positioned radial to said disk, means adapted to simultaneously position said rollers in the same path upon the said disk, concentric with the axis of rotation of the said disk, means at the outer end of each of said shafts adapted to coöperate and connect with the said rotative element, to revolve with the same, a compression member adapted to be manually positioned in adjustment and to cause pressure thereby between the said disk and the said roller or rollers.

6. In a variable speed transmission device, a rotative element, a disk adapted to rotate concentrically to said rotative element, a plurality of rollers adapted to be positioned radially and to roll on said disk, a shaft loosely keyed within each of said rollers, adapted to rotate with the same for any radial position of the roller with respect to said disk within operative limits, said shaft being positioned radially to said disk, means adapted to simultaneously position said rollers in the same path upon the said disk, concentric with the axis of rotation of said disk, a beveled gear mounted integral with and at the outer end of each of said shafts, a beveled gear integral and concentric with the said rotative element adapted to mesh with and coöperate with each of the beveled gears which are integral with said shafts, a compression member adapted to be manually positioned in adjustment and to cause pressure thereby between the said disk and the said roller or rollers.

7. In a variable speed transmission device, a disk, a shaft, a roller in tractive contact upon said disk, adapted to rotate with said shaft upon which it is concentrically mounted for longitudinal reciprocation, the axis of said shaft being radial to the axis of rotation of said disk, means adapted to position said roller longitudinally on said shaft, a rotative element having an axis of rotation common to the axis of rotation of said disk, means operative near the periphery of said disk, connecting the said rotative element with said shaft and adapted to rotate with the same, and a compression member adapted to produce pressure between said disk and said roller.

8. In a variable speed transmission device, tractive means comprising a pressure receiving means and a pressure transmitting means in contact therewith, a compression member adapted to be manually positioned in adjustment and to produce pressure between said tractive means, a rotative element having an axis of rotation common to the axis of rotation of said pressure transmitting means, means connecting the said element externally with the said receiving means and adapted to transmit motion therebetween.

9. In a variable speed transmission device, a shaft tractive means comprising a round element mounted upon said shaft for rotation therewith, and means adapted to rotate in contact with said round element, about axes which are radial to said shaft, radial shafts passing through said last named means, means adapted to vary the distance of point of contact of said tractive means from said first mentioned shaft, means adapted to produce pressure between parts of said tractive means, a rotative element having an axis of rotation common to that of said round element, means connecting the said rotative element externally with said radial shafts and operative therewith.

JOHN EDWARD THEBAUD.

Witnesses:
CLARA L. ABELL,
W. S. TUCKER.

Copies of this patent may be obtained for five cents each, by addressing the "Commissioner of Patents, Washington, D. C."